Patented May 22, 1934

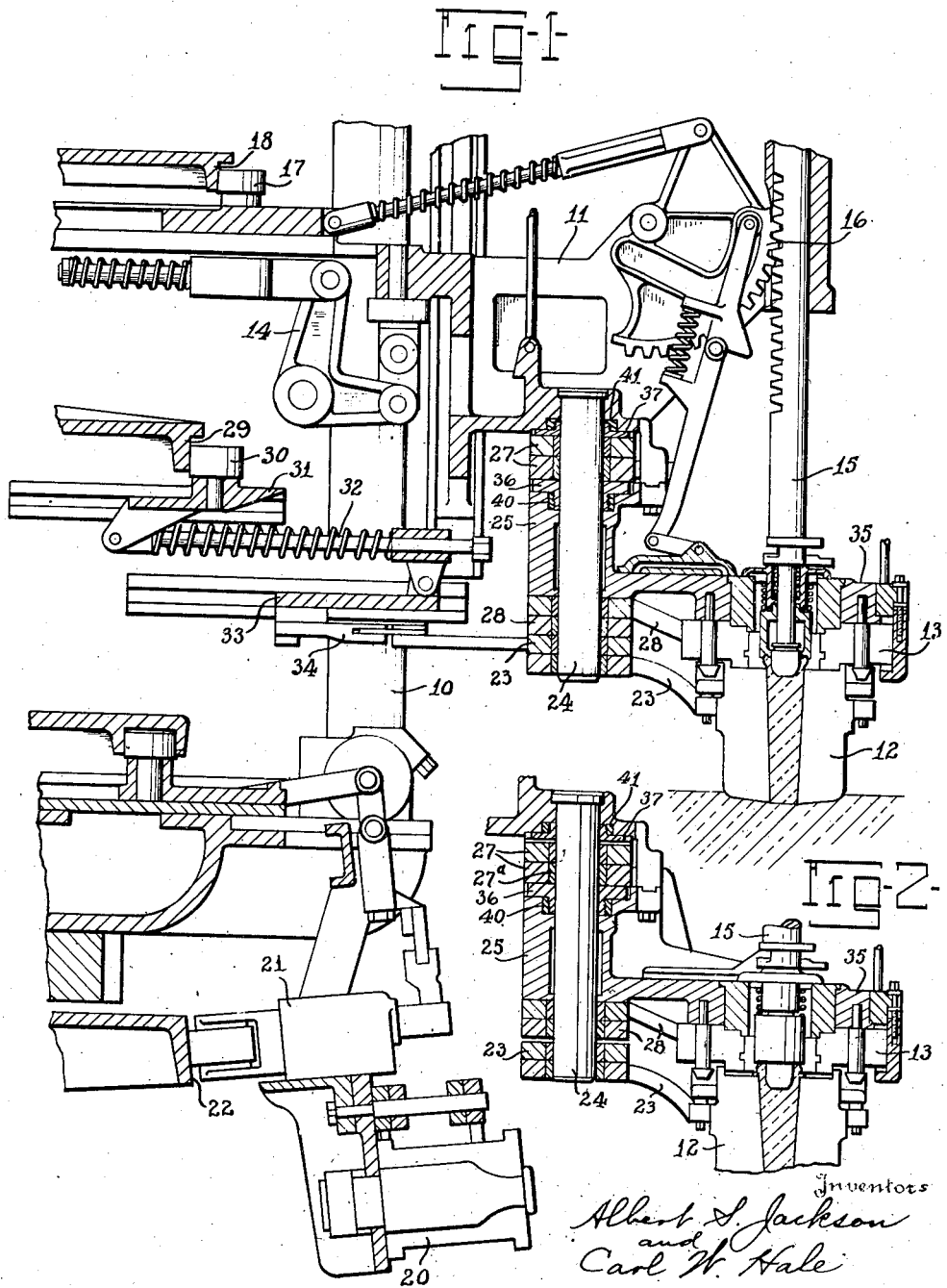

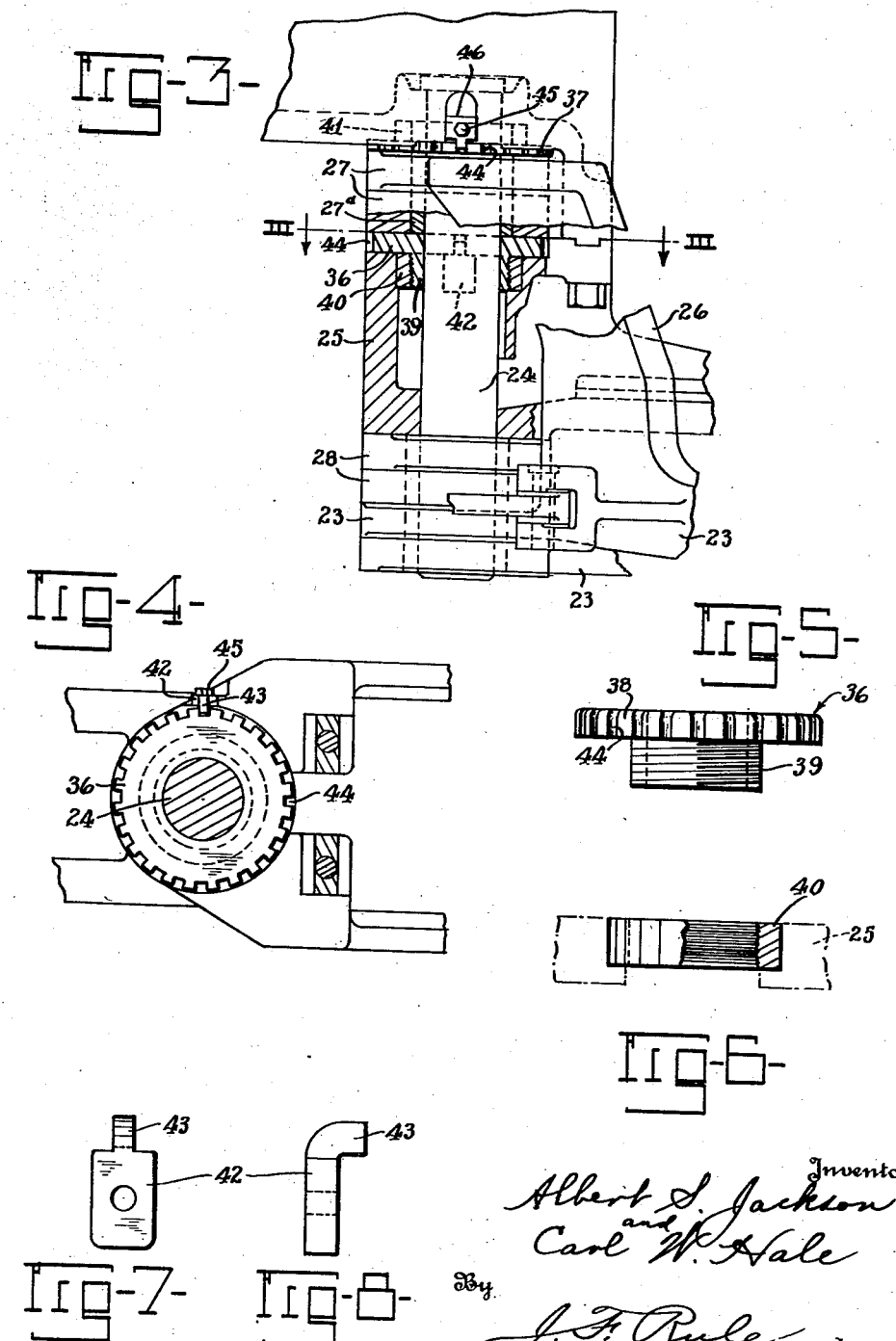

1,959,430

UNITED STATES PATENT OFFICE 1,959,430

MACHINE FOR FORMING GLASS ARTICLES

Albert S. Jackson and Carl W. Hale, Alton, Ill., assignors to Owens-Illinois Glass Company, a corporation of Ohio Application November 12, 1932, Serial No. 642,406

4 Claims. (Cl. 49—41)

Our invention relates to machines for molding glass articles, and particularly to machines of the suction gathering type in which the charges of glass are drawn by suction into a parison mold comprising a pair of separable blank mold sections for forming the body of the parison, and separable neck mold sections above and in register with the blank mold for forming the neck portion of the parison. In machines of this type, the blank mold sections are ordinarily carried on arms pivoted to swing on a vertical hinge pin for opening and closing the mold. The neck mold sections are likewise carried on arms pivoted on said hinge pin. After a charge of glass has been introduced into the parison mold and permitted to cool sufficiently to retain its shape, the blank mold sections are swung apart, leaving the bare parison suspended from the neck mold, after which it is enclosed in the finishing mold and blown to its final form.

In order to form perfect parisons, it is necessary to maintain the blank mold, while closed, in accurate register with the neck mold, and also necessary to prevent sagging or dropping of the blank mold sections during their opening movement, which would result in distorting the parison. It is found in practice that wear or looseness in the bearings for the blank mold arms permits such sagging of the blank molds to an objectionable degree.

An object of our invention is to overcome the above difficulty, and for this purpose we provide suitable adjusting means by which the bearings for the blank mold arms can be readily adjusted to counteract the effects of any looseness or wear in the bearings and to maintain a proper alignment of the blank mold with the neck mold.

Other objects of the invention will appear hereinafter

In the accompanying drawings:

Fig. 1 is a fragmentary sectional elevation of one unit of a machine embodying the present invention.

Fig. 2 is a fragmentary sectional elevation showing the hinge pin and bearings for the blank mold and neck mold arms after a certain amount of wear has appeared in the bearings.

Fig. 3 is a part sectional elevation showing the hinge pin, bearings and adjusting means.

Fig. 4 is a sectional plan view taken at the line III—III on Fig. 3, showing particularly one of the adjustable bushings.

Fig. 5 is an elevation view of the bushing shown in Fig. 4.

Fig. 6 is a part sectional view of a threaded ring or nut in which the bushing is adjustably mounted.

Figs. 7 and 8 are front and side elevational views, respectively, of a key for locking the bushing in its adjusted position.

Referring to the drawings, we have illustrated an Owens type of suction gathering machine to which our invention is applied. This machine comprises the usual rotating mold carriage 10 on which are mounted an annular series of heads or units (only one of which is herein shown). Each unit comprises a dip frame 11 carrying a parison mold which comprises a blank mold 12 and a neck mold 13 above and in register therewith. The dip frame is mounted for up and down movement on the carriage for periodically lowering the mold into position to gather its charge of glass by suction. The up and down movement of the dip frame is controlled by a stationary cam (not shown) operating through connections including a bell crank lever 14. A plunger 15 projects into the neck mold for forming the initial blow opening in the parison, the plunger being lowered and lifted to and from its operative position by a rack and pinion 16 having operating connections with a cam roll 17 running on a stationary cam 18. A finishing mold 20 carried on a swinging frame 21 under the control of a stationary cam 22, is periodically swung upward and encloses the parison after the blank mold has been opened, the parison being then blown to its final form in the finishing mold.

The blank mold 12 comprises horizontally separable sections carried on arms 23 pivoted on a vertical hinge pin 24 mounted in a bearing 25 in the dip frame. Each of the blank mold arms 23 has a yoke extension 26 (Fig. 3), the upper end of which is formed with a collar 27 journaled on the hinge pin 24 and providing an upper bearing for the mold arm. Bearing sleeves 27ᵃ may be interposed between the hinge pin and the collars 27. The neck mold sections are carried on arms 28 journaled on the pivot pin 24 immediately above the lower bearings of the blank mold arms. The blank mold sections are swung about their pivot for opening and closing the mold by a stationary cam 29 on which runs a cam roll 30 carried by a slide block 31 connected through a link 32 to a slide block 33 having operating connections 34 with the blank mold arms 23. The neck mold sections are opened in the usual manner by the final opening movement of the blank mold. The neck mold is mounted directly beneath a dip head 35 which forms part of the dip frame. The parts thus far described may be of usual construction and, except as they are combined and cooperate with the devices presently to be described, are not a part of the present invention.

In order to permit vertical adjustment of the blank mold into close contact with the neck mold, and particularly to take up any play or looseness which develops in the bearings for the mold arms due to wear, we provide adjusting means comprising lower and upper adjustable bushings 36 and 37, respectively, said bushings being located below and above the upper bearing collars 27 of the blank mold arms. The bushing 36 comprises a disk-like body portion 38, the upper flat horizontal surface of which forms a bearing for the under surface of the arm or collar 27 directly thereabove. The bushing also includes an externally screw threaded shank 39 which fits in a correspondingly threaded nut or ring 40, the latter having a fixed mounting in the bearing sleeve 25. The bushing is adjustable up and down on the pivot pin 24 by rotating it within the ring 40.

The upper bearing bushing 37 is of substantially the same construction as the bushing 36 and is mounted on the pivot pin 24 over the uppermost bearing collar 27, the upper bushing 37 being inverted as compared with the lower bushing so that its lower face forms a bearing surface for said upper collar 27. The shank of the bushing 37 is threaded into a ring 41 for up and down adjustment.

The bushing 36 is locked in its adjusted position by means of a key 42 formed with a lug 43 adapted to engage in any one of an annular series of notches 44 formed in the periphery of the bushing. The key 42 is held in locking position by means of a screw bolt 45. The upper bushing 37 is locked in like manner by a key 46.

It will be seen that by means of the construction above described the bearing bushings may be adjusted up and down, providing adjustable bearings for the blank mold arms so that the blank mold may be adjusted vertically to position it with respect to the neck mold. The adjustable bushings permit any looseness or play which develops in the bushings, due to wear or other cause, to be taken up. The blank mold may thus be maintained in accurate adjustment with respect to the neck mold and prevented from dropping or sagging during its opening movement, so that distortion of the blanks is prevented.

Modifications may be resorted to within the spirit and scope of our invention.

We claim:
1. In a machine for molding glass articles, the combination of a body blank mold comprising separable sections, blank mold arms carrying said sections, a hinge pin on which said arms are pivoted, a sectional neck mold above and in register with the blank mold, means for adjusting said arms lengthwise of the hinge pin, said adjusting means including bushings mounted on the hinge pin, respectively above and below the blank mold arms, and means for individually adjusting said bushings vertically on the hinge pin.

2. In a machine for molding glass articles, the combination of a blank mold comprising horizontally seperable sections, a vertical hinge pin, arms carrying the blank mold sections, each said arm including a yoke having upper and lower spaced bearings on said hinge pin, bushings mounted on the hinge pin above and below said upper bearings, and means for individually adjusting said bushings up and down.

3. In a machine for molding glass articles, the combination of a blank mold comprising horizontally separable sections, a vertical hinge pin, arms carrying the blank mold sections, each said arm including a yoke having upper and lower spaced bearings on said hinge pin, bushings mounted on said hinge pin, respectively above and below said upper bearings, each said bushing comprising a screw threaded shank, internally threaded rings to receive said shanks, the bushings being adjustable up and down by rotation in said rings, and means for locking the bushings in their adjusted position.

4. In a machine for molding glass articles, the combination of a parison mold comprising a sectional body blank mold and a sectional neck mold above and in register therewith, a mold carrying frame, a vertical hinge pin mounted in said frame, blank mold carrying arms in which the blank mold sections are mounted, each said arm comprising a bearing yoke having upper and lower bearings on the hinge pin, neck mold carrying arms journaled on the hinge pin above the lower blank mold carrying arms, bearing bushings mounted respectively above and below said upper bearings and providing horizontally disposed bearing surfaces for said upper bearings, internally threaded rings fixed in said frame, the bearing bushings having portions threaded into said rings, permitting rotation of the bushings for up and down adjustment, and means to lock the bushings in their adjusted positions.

ALBERT S. JACKSON.
CARL W. HALE.